No. 852,778. PATENTED MAY 7, 1907.
R. D'UNGER.
ELECTRIC CABLE.
APPLICATION FILED SEPT. 19, 1904. RENEWED OCT. 3, 1906.
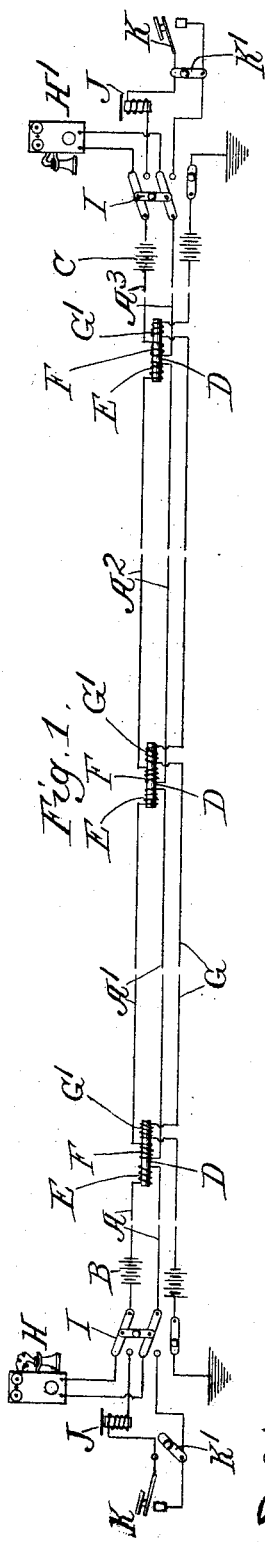
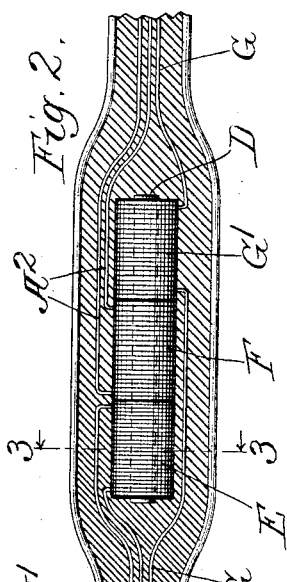
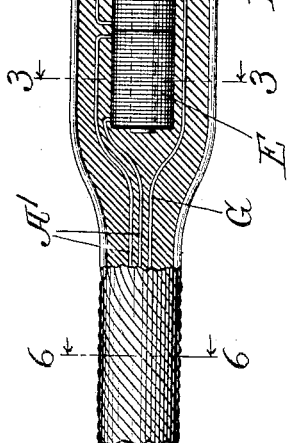
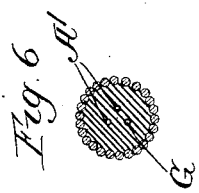
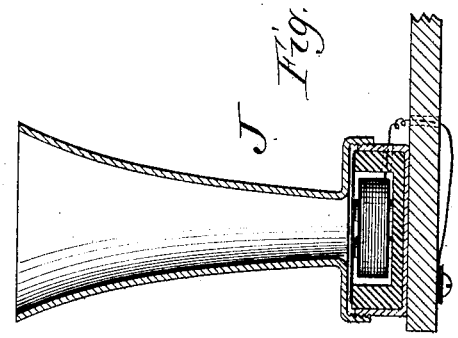
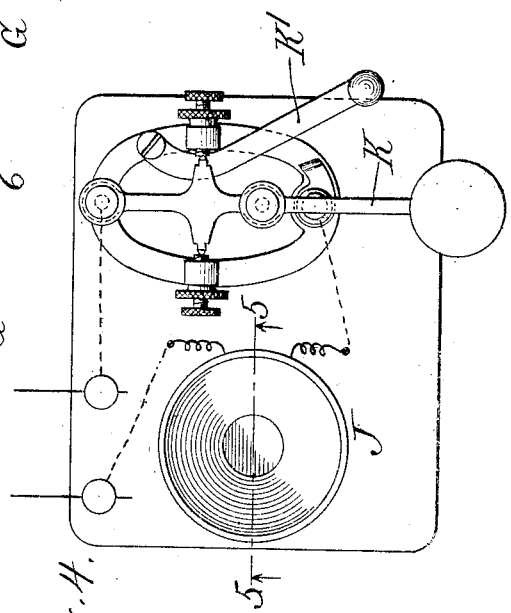
Witnesses.
Edward T. Wray.
Percival H. Truman.
Inventor
Robert D'Unger
by Parker & Carter
Attorneys

UNITED STATES PATENT OFFICE.

ROBERT D'UNGER, OF CHICAGO, ILLINOIS, ASSIGNOR, BY DIRECT AND MESNE ASSIGNMENTS, TO THE ELECTRIC LOOP AND CABLE COMPANY, A CORPORATION OF NEW JERSEY.

ELECTRIC CABLE.

No. 852,778.   Specification of Letters Patent.   Patented May 7, 1907.

Application filed September 19, 1904. Renewed October 3, 1906. Serial No. 337,209.

*To all whom it may concern:*

Be it known that I, ROBERT D'UNGER, a citizen of the United States, residing at Chicago, in the county of Cook and State of Illinois, have invented a certain new and useful Improvement in Electric Cables, of which the following is a specification.

My invention relates to electric cables, and has for its object the production of a new and improved electric cable for telephone, telegraph, and other electric appliances.

My invention is illustrated in the accompanying drawings, wherein

Figure 1 is a diagrammatic view illustrating the circuits; Fig. 2 is a portion of the cable in part section, illustrating my invention; Fig. 3 is a cross section taken on line 3—3 of Fig. 2; Fig. 4 is a plan view of one form of receiving instrument at the end of the table; Fig. 5 is a section taken on line 5—5 of Fig. 4; Fig. 6 is a sectional view taken on line 6—6 of Fig. 2.

Like letters refer to like parts throughout the several figures.

My invention is adapted to be used in any situation where it is desired to transmit electrical impulses to a distant point, and is particularly adapted for submarine cables and the like.

In carrying out my invention, I divide the line into a series of sections, as shown at A, A¹, A², A³, etc., Fig. 1, the two end sections being provided with sources of electric supply, B and C, of any suitable description. The conductors of two adjacent sections are wound upon a core, D, thus forming coils E, and F. It will be seen by this that the conductor is divided up into a series of sections with induction coils, as it were, connecting the adjacent sections.

Any desired number of sections and induction coils may be used, depending upon the length of the line, the conditions presented, and the results desired.

Under some conditions I run a continuous line or conductor G in the cable with the broken or sectional line, and in this case a portion of this conductor is wound upon each core D so as to form a coil G¹ thereon. This circuit is preferably grounded, and is provided with a source of electric supply. A current is therefore flowing through this circuit when the device is in operation, and this current acts on the iron cores which cores are at the same time acted upon by another current, namely, the current by which the message is communicated. The coils on the core D are preferably located along the length of the core so as to permit its diameter to be made as small as possible. When the device is used as a submarine cable the conductors are located within the cable, and are surrounded by suitable insulating material, as shown in Fig. 6, and the cores D and the various coils thereon are also located within the cable and surrounded by insulating material, as shown in Figs. 2 and 3, the cable being provided with a protecting sheath, as illustrated. It is, of course, evident that the cable can be of any desired form, and the core and various coils simply produce an enlargement, as illustrated in Fig. 2. It will thus be seen that these sections and coils may be multiplied to any desired extent.

As illustrated in Fig. 1, I have shown diagrammatically a telephone apparatus H and H¹ at each end, and also a telegraphic apparatus at each end; a double pole switch may be employed to change the circuit from the telegraphic instrument to the telephonic instrument, although the circuits may be arranged so that this switch is not necessary, it being shown here for purposes of illustration.

I prefer to associate with the telegraphic instrument a telephone receiver J in the place of the ordinary sounder, as this is more sensitive. When the telegraphic circuit breaker K is operated it sends impulses along the line and they act upon the telephone receiver and cause its diaphragm to move, and the operator by the sound can thus distinguish the message just the same as with the ordinary sounder.

In some instances it may be desirable for the operator to use an ordinary headband-receiver instead of having the receiver placed upon the instrument as herein shown.

In Figs. 4 and 5 I have illustrated the ordinary telegraphic instrument or key K with the telephone receiver J fastened to the same base. By means of this device the electrical impulse whether from breaking the circuit, as by means of the telegraph instrument, or varying the current, as by means of the telephone instrument, is multiplied in intensity by the induction coils, and is thus transmitted from one section of the conductor to the other until the terminal reached, where-upon it acts upon the appropriate instrument and a telegraphic, telephonic, or other message is delivered. The telegraphic instruments are each provided with the switches $K^1$ in the ordinary way, the switch at the sending station being open when the device is in operation, and that at the receiving station closed.

I have described in detail a particular construction embodying my invention, but it is, of course, evident that the parts may be varied in many particulars and I, therefore, do not limit myself to the construction shown.

I claim:

1. The combination with a series of electrical conductors formed into continuous adjacent circuits, a part of each two adjacent circuits being wound upon a common core, of a continuous circuit associated therewith having a part wound upon each of said cores.

2. The combination with a transmitting and receiving instrument located at distant points of a connecting conductor made up of a series of disconnected looped circuits, parts of each two adjacent circuits wound upon a metallic core, said cores distributed at intervals along the line between the instruments, and a continuous circuit associated with said disconnected circuits and having a part thereof wound around each of said cores.

3. The combination with two sets of telephone instruments and two sets of telegraph instruments of a connecting conductor made up of a series of disconnected looped circuits placed end to end and electrically insulated from each other, parts of each two adjacent circuits being wound upon a metallic core so as to form coils with the ends abutting, and a continuous conductor associated with said looped circuits, and having a part thereof wound around each of said cores, said cores distributed at intervals along the line between the instruments and embedded in insulating material so as to form a continuous cable, and means for alternately connecting the telephone and telegraph instruments with said conductor.

4. An electric cable made up of a series of disconnected conductors, portions of the adjacent sections of each conductor being wound upon a common core, a continuous conductor extending the length of the cable and having a portion wound around each of said cores, a source of electric supply in said continuous conductor, the said conductors and cores embodied in a continuous cable.

ROBERT D'UNGER.

Witnesses:
HOMER L. KRAFT,
PERCIVAL W. ORMWAY.